United States Patent
Qin et al.

(10) Patent No.: US 11,418,079 B1
(45) Date of Patent: Aug. 16, 2022

(54) PERMANENT-MAGNET MACHINES UTILIZING PROTRUDING MAGNETS

(71) Applicant: MAGICALL, Inc, Camarillo, CA (US)

(72) Inventors: Dinyu Qin, Oak Park, CA (US); Joel B Wacknov, Westlake Village, CA (US)

( * ) Notice: Subject to any disclaimer, the term of this patent is extended or adjusted under 35 U.S.C. 154(b) by 0 days.

(21) Appl. No.: 16/986,520

(22) Filed: Aug. 6, 2020

Related U.S. Application Data

(63) Continuation of application No. 15/149,744, filed on May 9, 2016, now Pat. No. 10,742,086.

(51) Int. Cl.
  *H02K 3/18* (2006.01)
  *H02K 1/2786* (2022.01)
  *H02K 1/14* (2006.01)

(52) U.S. Cl.
  CPC .............. *H02K 3/18* (2013.01); *H02K 1/146* (2013.01); *H02K 1/2786* (2013.01)

(58) Field of Classification Search
  CPC ......... H02K 3/18; H02K 1/146; H02K 1/2786
  See application file for complete search history.

(56) References Cited

U.S. PATENT DOCUMENTS

| | | | |
|---|---|---|---|
| 4,155,021 A * | 5/1979 | Gorbach | H02K 1/17 310/154.07 |
| 5,604,389 A | 2/1997 | Nitta | |
| 8,714,948 B2 | 5/2014 | Baba | |
| 2003/0057797 A1 | 3/2003 | Kaneko | |
| 2008/0048513 A1* | 2/2008 | Wilsdorf | H02K 31/00 310/74 |
| 2011/0025140 A1 | 2/2011 | Pennander | |
| 2011/0133596 A1 | 6/2011 | Asano | |
| 2012/0001510 A1 | 1/2012 | Uni | |
| 2012/0153760 A1* | 6/2012 | Kimiabeigi | H02K 21/22 310/154.01 |
| 2012/0187696 A1* | 7/2012 | Miyamoto | H02K 1/276 290/55 |
| 2013/0127264 A1 | 5/2013 | Fick | |
| 2013/0270958 A1* | 10/2013 | Takahashi | H02K 21/14 310/156.38 |
| 2015/0028708 A1* | 1/2015 | Matsuoka | H02K 1/278 310/156.07 |
| 2018/0212502 A1* | 7/2018 | Finkle | H02K 21/46 |

* cited by examiner

*Primary Examiner* — Naishadh N Desai
(74) *Attorney, Agent, or Firm* — Deirdre M Kvale; DMK Intellectual Property Law PLLC

(57) ABSTRACT

A magnetic machine including a rotor in concentric arrangement with a stator. The rotor includes a plurality of protruding magnets arranged on a back iron and the stator includes a plurality of windings which interface with the plurality of protruding magnets. Illustrated embodiments of the rotor and stator form an in-runner machine where the stator surrounds an interior rotor or an out-runner machine where the rotor surrounds the stator.

20 Claims, 6 Drawing Sheets

PERMANENT-MAGNET MACHINES UTILIZING PROTRUDING MAGNETS

CROSS-REFERENCE TO RELATED APPLICATIONS

This application is a continuation application of U.S. Ser. No. 15/149,744 entitled PERMANENT-MAGNET MACHINES UTILIZING PROTRUDING MAGNETS which claims priority to U.S. Provisional Application No. 62/158,572, filed May 8, 2015, entitled Line Stabilizer, the content of which are hereby incorporated by reference herein in their entirety.

FIELD OF THE INVENTION

The present disclosure relates to magnet machines and, in particular, permanent magnet machines. More particularly, the present disclosure relates to permanent magnet machines utilizing magnets of one or more shapes. Still more particularly, the present disclosure relates to permanent magnet machines utilizing protruding magnets.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motors and/or generators, or electric machines, may be constructed using coils and/or permanent magnets. Where permanent magnets are used, the motors and/or generators may be referred to as permanent magnet electric machines. Permanent magnet electric machines are increasing in use in various applications due to the development of magnet materials and power electronics.

Electric machines can include a rotor and a stator where the stator is a stationary portion of the machine and the rotor is a rotating portion of the machine. The machines may include a series of magnets supported on a back iron. The high densities and costs of the materials to form the magnets and the back iron may cause them to be relatively heavy and also relatively expensive. Expense can play a role in the overall cost of a system in which the motor/generator is being used and, as such, reducing expense can offer an economic advantage. The heaviness of the machines may cause them to be less efficient due to higher moments of inertia. For example, a heave rotor may call for higher energy inputs for rotation, thus, reducing the efficiency of the machine. Still further, heavy motors may not be preferred where an overall weight of a system is desired to be relatively low. Accordingly, weight reduction can make motor/generators more efficient and more desirable for purposes of weight reduction of an associated system, for example, in an aerospace application.

SUMMARY

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

In one or more embodiments, a permanent magnet machine may include a stator and a rotor. The rotor may be in concentric arrangement with the stator and may be configured for rotation relative to the stator. The rotor may have a plurality of protruding magnets arranged thereon. The protruding magnets may provide for a more lightweight machine with a lower moment of inertia.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying FIGS, in which:

DETAILED DESCRIPTION OF ILLUSTRATIVE EMBODIMENTS

The present disclosure, in some embodiments, relates to permanent-magnet machines having protruding magnets. The protruding magnets may be provided on the rotor of the machine and may extend into the back iron that supports the magnets. The protruding shape may allow for a displacement of back iron with magnet material allowing for the back iron weight to be reduced. Still further, the protruding shape of the magnets may allow for a back iron material with a relatively lower magnetic saturation point, which may reduce the costs of the back iron, and resulting machine, considerably. Still further, the protruding shape of the magnets may make the machine air gap flux density waveform and induced winding voltage waveform closer to being sinusoidal, which can be advantageous in particular applications.

Figure 1:
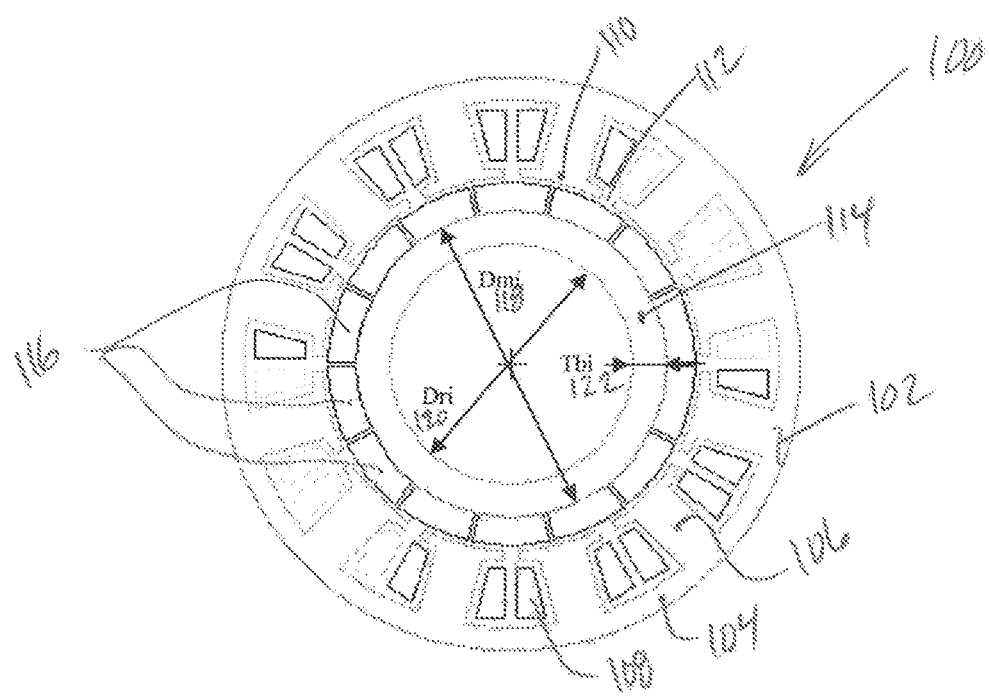
FIG. 1 is a cross-sectional view of an electric machine with magnets having concentric radius-type edges.
Figure 2:
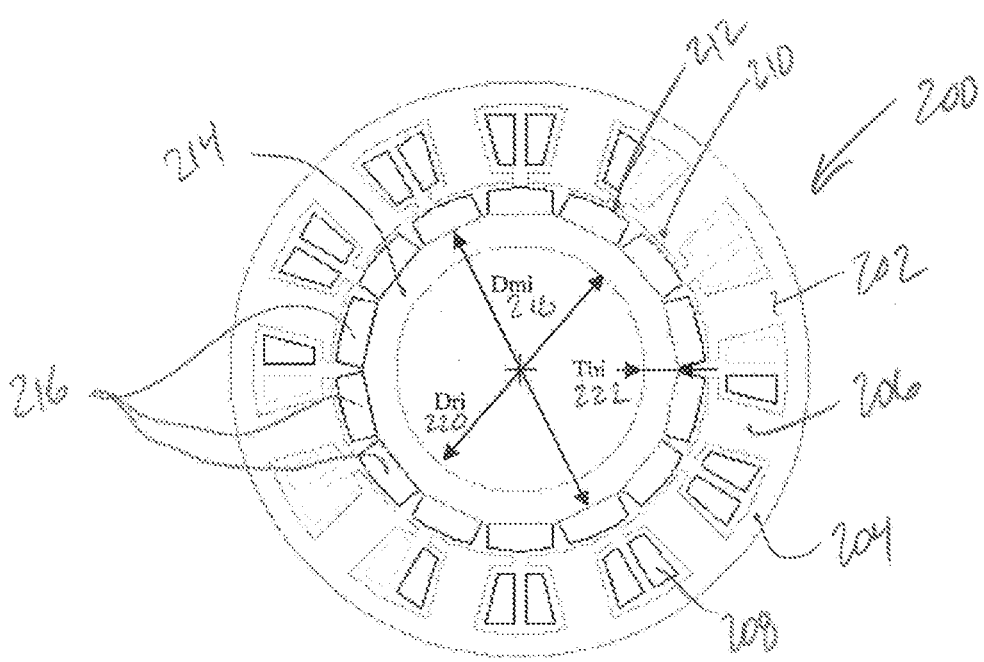
FIG. 2 is a cross-sectional view of an electric machine with magnets having a bread-loaf shape.
Figure 3:
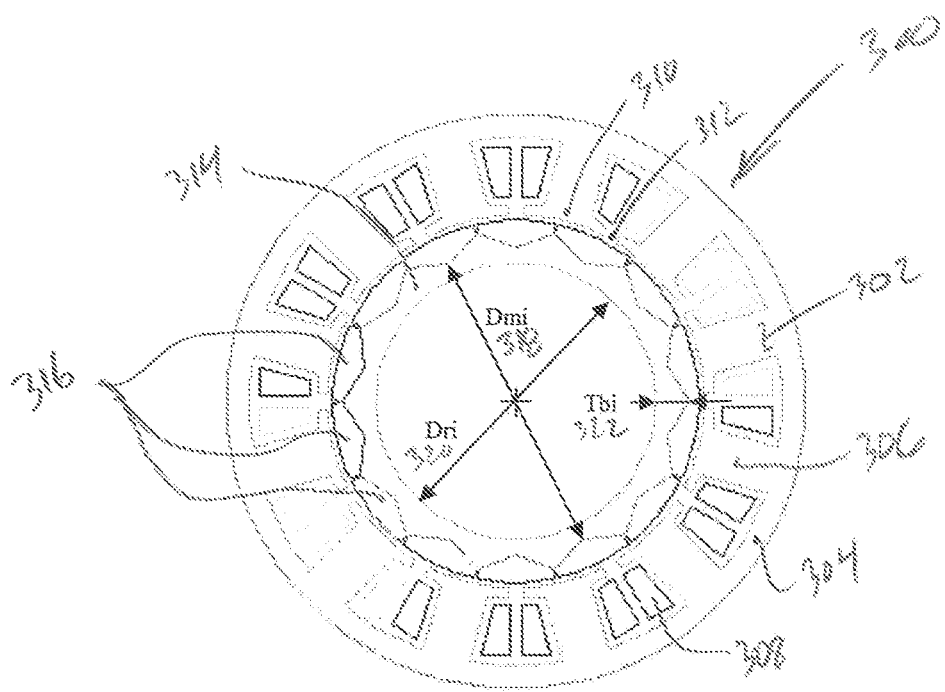
FIG. 3 is a cross-sectional view of an electric machine with magnets having a protruding shape.
Figure 4:
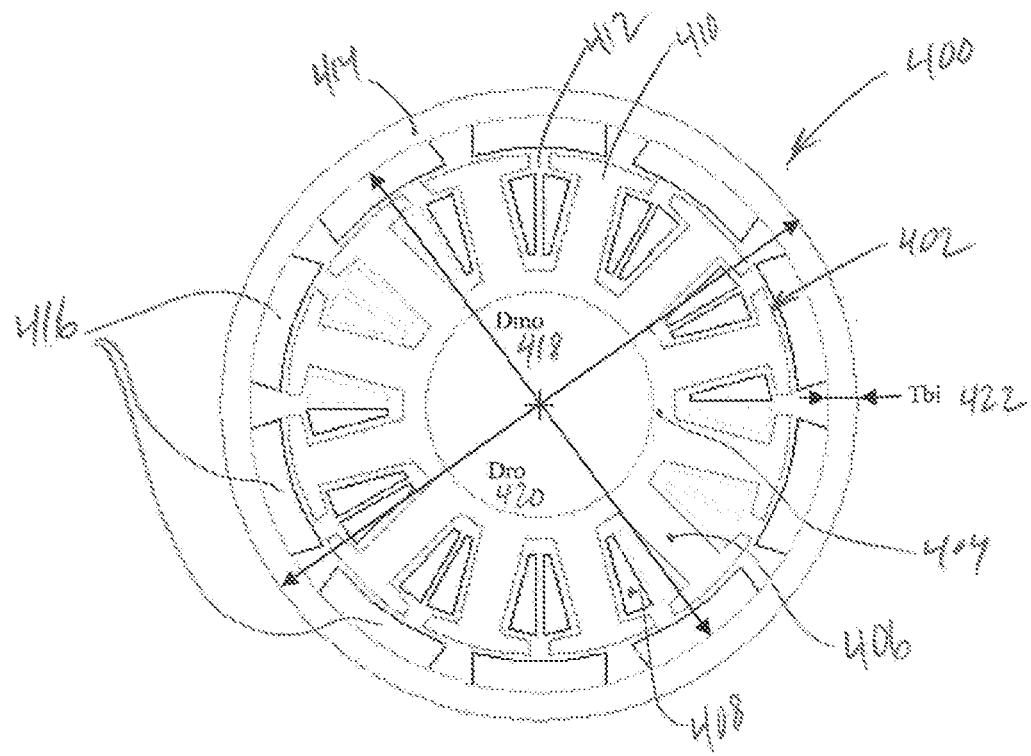
FIG. 4 is a cross-sectional view of an electric machine with magnets having concentric radius-type edges.
Figure 5:
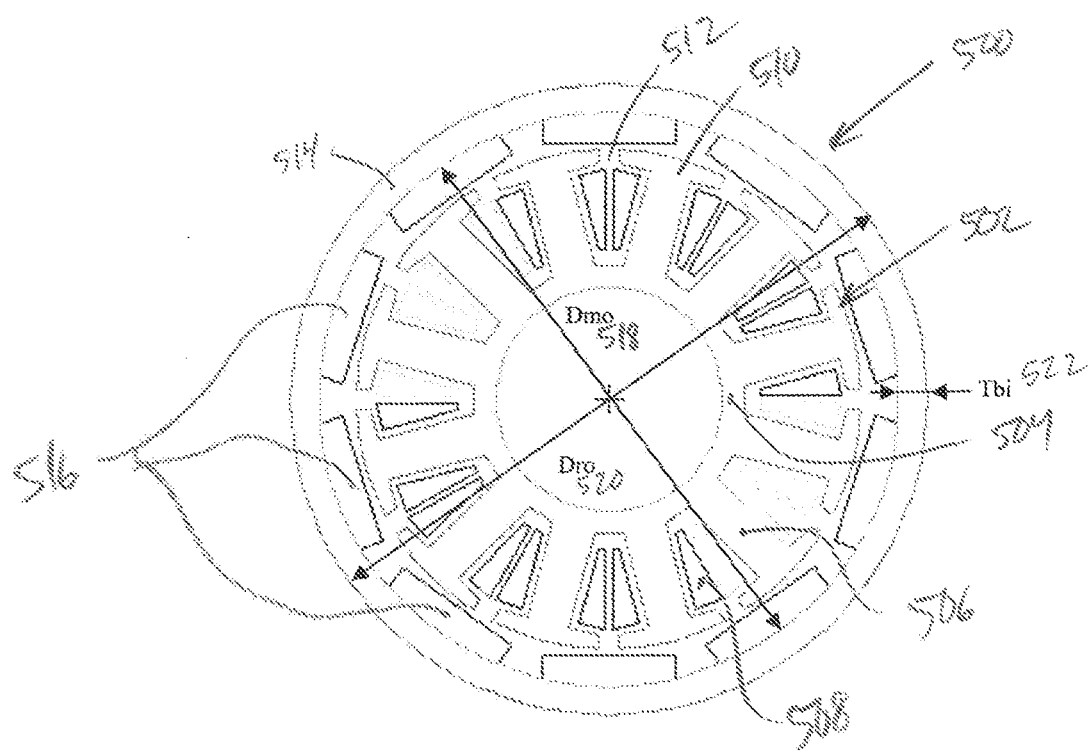
FIG. 5 is a cross-sectional view of an electric machine with magnets having a bread-loaf shape.
Figure 6:
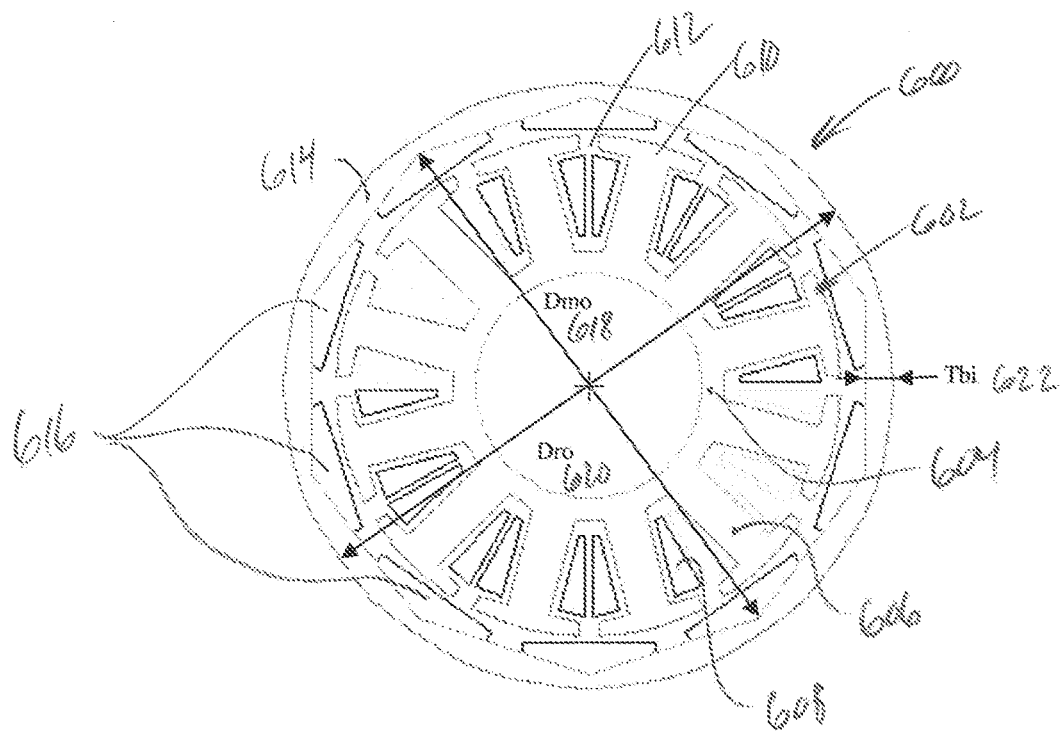
FIG. 6 is a cross-sectional view of an electric machine with magnets having a protruding shape.

Referring now to FIGS. 1-3, a series of electric machines 100, 200, 300 are shown. The machines in these three figures may be referred to as in-runner machines because they include a stationary portion, or stator, that surrounds an interior rotating rotor. In contrast, the series of machines in FIGS. 4-6 may be referred to as out-runner machines because they are the reverse of the machines in FIGS. 1-3. That is, the stator in FIGS. 4-6 is on the inside and the rotor surrounds and rotates about the stator.

With continued reference to FIGS. 1-3, the outside portion, or stator 102, 202, 302, may include a stator stack and a series of associated windings. The stator stack may include an outer shell or stator back iron 104, 204, 304 extending around a circular perimeter of the stator. That stator stack may also include a series stems, spools, or teeth 106, 206, 306 extending radially inward from the outer shell. The stems, spools, or teeth may be spaced apart along the stator back iron 104, 204, 304 and may be configured to receive the windings 108, 208, 308 where the windings may be wrapped or wound around the radially inward extending teeth 106, 206, 306. The teeth may include a spool end, stop portion, or tooth tip extending laterally from the inward end of the teeth so as to maintain the windings on the teeth. The tooth tips 110, 210, 310 may extend laterally an equal distance in each direction and may stop short of neighboring tooth tips on each side defining a winding gap or slot opening 112, 212, 312. The tooth tip may include a curved inside surface. The inside surface of the plurality of tooth tips may define a stator bore with a radius and in which the rotor may be arranged and rotate. Depending on the design of the machine, the stator stack may include 12 teeth as shown, or another number of teeth may be provided. The number of teeth may be adjusted based on a series of design considerations.

The windings 108, 208, 308 may be wrapped on the teeth to form a series of coils arranged around the perimeter of the stator stack. The windings may be wrapped around a single tooth or the windings may be wrapped around a plurality of teeth. In some embodiments, the windings may be arranged consecutively and adjacent to one another and in other embodiments, the windings may be arranged consecutively and overlapping, for example. Still other winding arrangements and approaches may be provided.

With continued reference to FIGS. 1-3, the rotor may include a backer portion or back iron 114, 214, 314 and a plurality of magnets 116, 216, 316. In some embodiments, as shown, the rotor may include 14 magnets defining 14 poles or another number of magnets may be used. The number of magnets may be adjusted to be compatible with the number of teeth based on theories and practical considerations. The magnets may be generally equally spaced about the perimeter of the rotor and may be secured to the back iron with a suitable adhesive.

The back iron may include an inner radius and a thickness defining an outer surface thereof. As will be apparent from the further discussion below, the thickness may be relatively constant or the thickness may vary from location to location. The rotor may include a plurality of magnets arranged on the outer surface of the back iron. The magnets may include a radiused outer surface defining an outer diameter of the rotor that is concentrically sized and arranged relative to the inside surface of the tooth tips and defining a gap between the stator bore and the rotor. It is to be appreciated that stator back iron and rotor back iron are commonly used industry terms used for referring to these respective portions of the machine. However, the term "iron" in these terms should not be construed to require that these elements be made of iron.

In some embodiments, the back iron of the stator and/or the rotor may be made of iron or iron alloys. In some embodiments, the back iron of the stator and/or the rotor may be made of other materials.

Referring, in particular now, to FIG. 1, the thickness of the back iron 114 may be substantially constant and the magnets may have a radiused inner surface with a curvature matching that of the outer surface of the back iron. As shown, the magnets may, thus, have an arc shape with a substantially constant thickness. As shown, an inner magnet diameter (Dmi) 118 may be defined as the diameter across the rotor from an inside surface of one magnet to the inside surface of a magnet on an opposite side of the rotor. The inner magnet diameter 118 may be measured near the center or mid-width of opposing magnets as shown. Additionally, an inner back iron diameter (Dri) 120 may be defined as the diameter across the rotor between opposing inside faces of the back iron 114. In the present embodiment, half of the difference between the inner magnet diameter 118 and the inner back iron diameter 120 may define a back iron thickness 122 (Thi).

It is noted that one function of the back iron is to conduct the magnets' magnetic flux. In addition, magnetic materials used for the back iron may be subject to saturation and the back iron thickness may be relevant for purposes of calculating an allowed saturation level. In some embodiments, there may be a minimum or preferred back iron thickness to achieve reasonable performances of the machine. Moreover, due to magnetic flux distribution, the relevant back iron thickness may be measured at a location near the side of the magnet rather than, for example, aligned with the center of the magnet (i.e., rather than measuring from the inside face of the magnet to the inside face of the back iron near a magnet's center, this measurement may be taken near the side of the magnet or where the magnet abuts an adjacent magnet as shown in FIG. 1). In the present embodiment, such measurement location may not result in any differences, but in further embodiments, it may.

Figure 7:
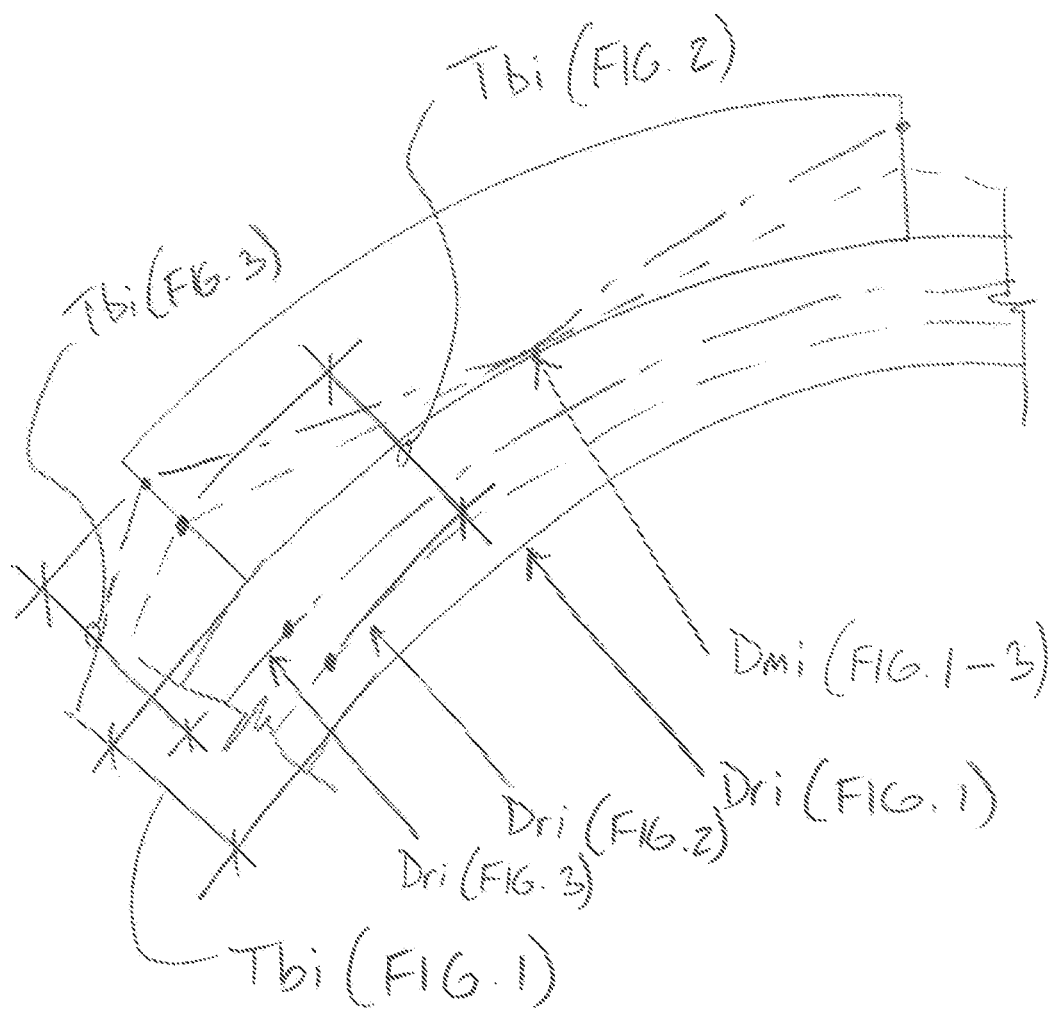
FIG. 7 is a close-up overlay of the several magnets of FIGS. 1-3.

Referring now to FIG. 2, a bread-loaf shaped magnet 216 is shown, where the inside surface of the magnet is substantially or completely flat and does not arc. This is in contrast to the magnets 116 of FIG. 1 that have a curved inner surface. However, the inner magnet diameter 218 (measured at the mid-width of the magnet) and the backer portion thickness 222 (measured at the side of the magnet) may remain constant as compared to the same dimensions of FIG. 1. Accordingly, in transitioning from the arc-shaped magnets 116 of the FIG. 1 to the bread-load shaped magnets 216 of FIG. 2, the inner backer portion diameter (Dri) 220 may be increased as shown in the comparison of FIG. 7 and the overall amount of material used for the back iron may be reduced.

Referring now to FIG. 3, a protruding magnet 316 is shown, where the inside surface of the magnet is convex relative to the center of the machine. That is, in contrast to FIG. 1, the inside surface is convex rather than concave and in contrast to FIG. 2, the inside surface is not substantially flat. Like FIG. 2, the inner magnet diameter (Dmi) 318 and the back iron thickness (Thi) 322 remain unchanged. This results in an exacerbation of the effect shown in FIG. 2. That is, as the sides of the magnet are moved away from the center of the machine and the back iron thickness (Thi) 222 measured at that location is unchanged, the inner backer portion diameter (Dri) 320 increases still further beyond that shown in FIG. 2. Accordingly, as shown in the comparison of FIG. 7, this results in a still further larger inner back iron diameter 320.

Table 1 below shows the comparison of the inner back iron diameter (Dri) in relative scales of the three machines shown in FIGS. 1-3. When machine configuration details, such as the number of magnets, change, comparison result may vary. The present comparison is based on a stator outer diameter of approximately 50 mm.

TABLE 1

| FIG. 1 | FIG. 2 | FIG. 3 |
|---|---|---|
| 1.00 | 1.03 | 1.28 |

In comparing the three designs of FIGS. 1-3, as mentioned, the magnet outer diameters may be the same. In addition, the stator dimensions may also all be the same. Where machines are constructed with the same axial component lengths (i.e., out of plane to the FIGS. 1-3), the machines in the three figures may have very similar performances. That is, because the relevant dimensions (Dmi and Thi) remain substantially constant across the three designs, the resulting performance remains relatively similar. However, because the inner backer portion diameter (Dri) is quite larger, the machine in FIG. 3 may have a relatively lighter-weight rotor. This may be very advantageous in applications or implementations calling for a minimum or reduced rotor or machine weight.

While a particular example is shown, the range of comparable diameters may be such that the protruding magnet provides a diameter that is at least approximately 5% greater than a comparable diameter without protruding magnets or at least approximately 10% greater, or at least approximately 15% greater, or at least approximately 20% greater or at least approximately 28% greater as shown in the example. Still other ratios may be provided.

Turning now to FIGS. 4-6, a series of out-runner machines 400, 500, 600 are shown. That is, the stator may be arranged on the inside and the rotor may be arranged about the stator and may rotate relative to the stator. The several parts of the stator and the rotor may be similar to those of the in-runner type machine. For example, the inside portion, or stator 402, 502, 602, may include a stator stack and a series of associated windings. The stator stack may include an inner shell or stator back iron 404, 504, 604 extending around a circular inside portion of stator. That stator stack may also include a series stems, spools, or teeth 406, 506, 606 extending radially outward from the inner shell or stator back iron. The stems, spools, or teeth may be spaced apart along the stator back iron and may be configured to receive the windings 408, 508, 608 where the windings may be wrapped or wound around the radially outward extending teeth. The teeth may include a spool end, stop portion, or tooth tip 410, 510, 610 extending laterally from the outward end of the teeth so as to maintain the windings on the teeth. The tooth tip may extend laterally an equal distance in each direction and may stop short of neighboring tooth tips on each side defining a winding gap or slot opening 412, 512, 612. The tooth tip may include a curved outside surface. The outside surface of the plurality of tooth tips may define a stator perimeter with a radius and about which the rotor may be arranged and rotate. Depending on the design of the machine, the stator stack may include 12 teeth as shown, or another number of teeth may be provided. The number of teeth may be adjusted based on a series of design considerations.

The windings 408, 508, 608 may be wrapped on the stems or spools to form a series of coils arranged around the perimeter of the stator stack. The windings may be wrapped around a single stern or the windings may be wrapped around a plurality of sterns. In some embodiments, the windings may be arranged consecutively and adjacent to one another and in other embodiments, the windings may be arranged consecutively and overlapping, for example. Still other winding arrangements and approaches may be provided.

With continued reference to FIGS. 4-6, the rotor may include a backer portion or back iron 414, 514, 614 and a plurality of magnets. In some embodiments, as shown, the rotor may include 10 magnets defining 10 poles or another number of magnets may be used. The number of magnets may be adjusted to be compatible with the number of teeth based on theories and practical considerations. The magnets may be generally equally spaced about the perimeter of the rotor and may be secured to an inside surface of the back iron with a suitable adhesive.

The back iron 414, 514, 614 may include an inner radius and a thickness defining an outer surface thereof. As will be apparent from the further discussion below, the thickness may be relatively constant or the thickness may vary from location to location. The rotor may include a plurality of magnets 416, 516, 616 arranged on the inner surface of the back iron. The magnets may include a radiused inner surface defining an inner diameter of the rotor that is concentrically sized and arranged relative to the outside surface of the teeth and defining a gap between the stator perimeter and the rotor.

Referring, in particular now, to FIG. 4, the thickness of the back iron 414 may be substantially constant and the magnets 416 may have a radiused outer surface with a curvature matching that of the inner surface of the back iron. As shown, the magnets may, thus, have an arc shape with a substantially constant thickness. In contrast to the arc-shaped magnets of FIG. 1, however, the magnets in FIG. 4 may be convex relative to the center of the machine rather than concave and, yet, might not be considered "protruding." That is, other considerations beyond whether the magnet is concave or convex may be considered to determine whether a magnet is protruding and the approach may be different when considering an in-runner machine as compared to an out-runner machine.

As shown, an outer magnet diameter (Dmo) 418 may be defined as the diameter across the rotor from an outside surface of one magnet to the outside surface of a magnet on an opposite side of the rotor. The outer magnet diameter 418 may be measured near the center or mid-width of opposing magnets as shown. Additionally, an outer back iron diameter (Dro) 420 may be defined as the diameter across the rotor between opposing outside faces of the back iron. In the present embodiment, half of the difference between the outer magnet diameter and the outer back iron diameter may define a back iron thickness (Thi) 422.

As with the in-runner type machine, due to magnetic flux distribution, the relevant back iron thickness may be measured at a location near the side of the magnet rather than, for example, aligned with the center of the magnet (i.e., rather than measuring from the outside face of the magnet to the outside face of the back iron near a magnet's center, this measurement may be taken near the side of the magnet or where the magnet abuts or neighbors an adjacent magnet as shown in FIG. 4). In the present embodiment, such measurement location may not result in any differences, but in further embodiments, it may.

Figure 8:
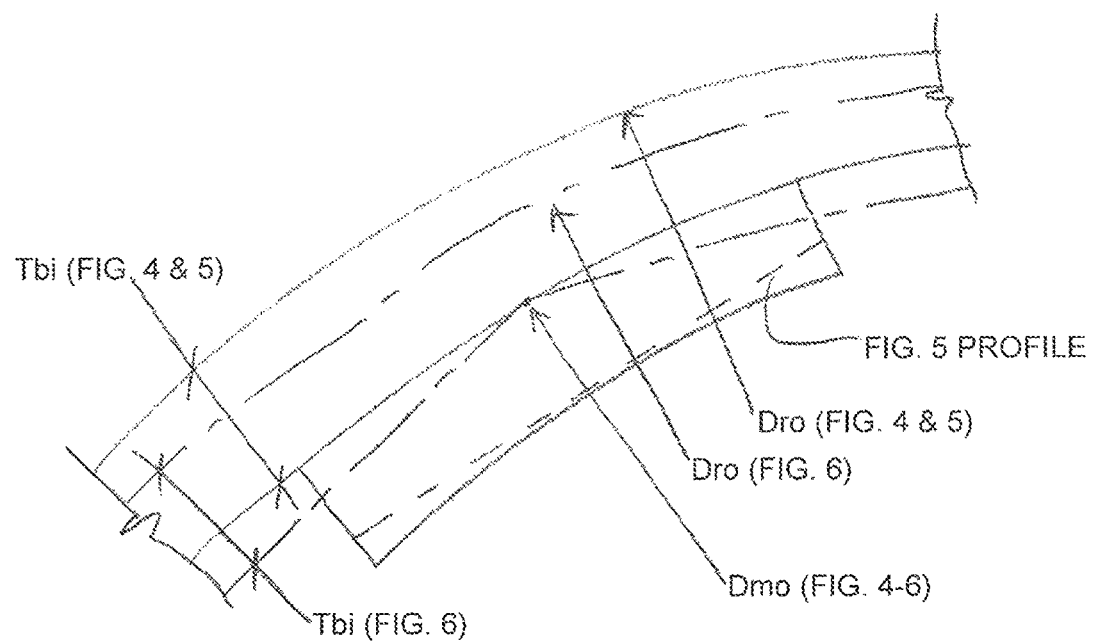
FIG. 8 is a close-up overlay of the several magnets of FIGS. 4-6.

Referring now to FIG. 5, a bread-loaf shaped magnet 516 is shown, where the inside surface of the magnet 516 is substantially or completely flat and does not arc. This is in contrast to the magnets 416 of FIG. 4 that have a curved inner surface. However, the outer magnet diameter (Dmo) 518 (measured at the mid-width of the magnet) and the back iron thickness 522 (Tbi) (measured at the side of the magnet) may remain constant as compared to the same dimensions of FIG. 4. Unlike the effect this change in shape had in FIG. 2 for an in-runner type machine, the effect of changing the magnets to bread-loaf shape for an out-runner machine may not affect the back iron 514 of the machine. That is, because the relevant dimensions for an out-runner machine may be the outer magnet diameter 518, the outer back iron diameter 520 and the back iron thickness 522. Changing the magnet from an arc-shaped magnet 416 to a bread-loaf style magnet 516 may not affect the size or shape of the back iron 514. As shown in FIG. 8, this approach may reduce the size of the magnets slightly, but it may not have an effect on the back iron 514.

Referring now to FIG. 6, a protruding magnet 616 is shown. In particular, the outer back iron diameter (Dro) 620 is reduced while the outer magnet diameter (Dmo) 618 and the back iron thickness (Tbi) 622 remain unchanged. This results in a change in shape of the magnet and causes the magnet to extend into the thickness of the back iron 614 as compared to FIGS. 4 and 5. This is shown in FIG. 8.

Table 2 below shows the comparison of the outer back iron diameter (Dro) in relative scales of the three machines shown in FIGS. 4-6. When machine configuration details, such as number of magnets, change, comparison result may vary. The present comparison is based on a rotor outer diameter of approximately 20 mm.

TABLE 2

| FIG. 4 | FIG. 5 | FIG. 6 |
|---|---|---|
| 1.00 | 1.00 | 0.96 |

In comparing the machines of FIGS. 4-6, the outer magnet diameter (Dmo) is the diameter in middle of the magnet's outside, the outer back iron diameter (Dro) is the rotor outer diameter, and the back iron thickness (Tbi) is the thickness of the back iron measured at a location near the side of the magnet. The outer magnet diameter (Dmo) and that back iron thickness (Tbi) have the same dimensions in each of FIGS. 4-6. However, the outer back iron diameter (Dro) is smaller in FIG. 6 than those in FIG. 4 and FIG. 5. Similar to the in-runner case, the advantages listed for the in-runner machines are still valid for out-runner machines. That is, where the stator dimensions are the same and where machines are constructed with the same axial component lengths (i.e., out of plane to the FIGS. 4-6), the machines in the three figures may have very similar performances. That is, because the relevant dimensions (Dmo and Thi) remain substantially constant across the three designs, the resulting performance remains relatively similar. However, because the outer back iron diameter (Dro) is quite smaller, the machine in FIG. 6 may have a relatively lighter-weight rotor. This may be very advantageous in applications or implementations calling for a minimum or reduced rotor or machine weight.

While a particular example is shown, the range of comparable diameters may be such that the protruding magnet provides a diameter that is at least approximately 1% less than a comparable diameter without protruding magnets or at least approximately 2% less, or at least approximately 3% less, or at least approximately 4% less as shown in the example. Still other ratios of diameter change may be provided.

Figure 9:
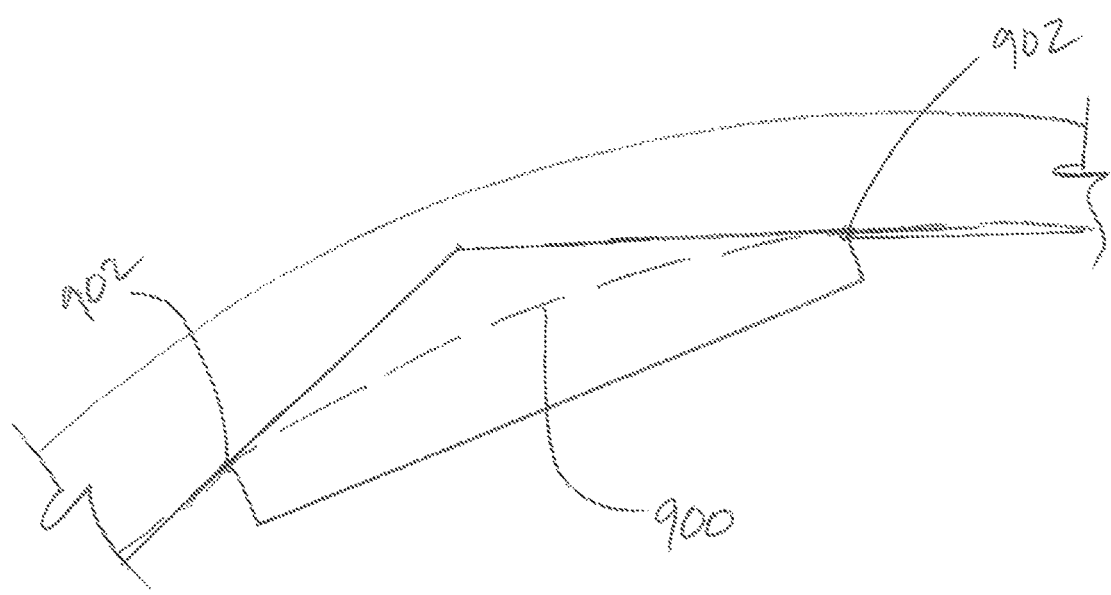
FIG. 9 is a close-up view of a protruding magnet for an out-runner machine.

It is to be appreciated that whether a magnet is protruding may depend on whether the magnet is on an in-runner type machine or an out-runner. For an in-runner machine, as shown in FIGS. 1-3, if the surface of the magnet in contact with the back iron is convex relative to the center of the machine, the magnet may be considered to be protruding. The convex shape may be in the form of a parabolic, elliptical, or other curve, a pair or series of line segments or other lines or curves that may form a convex shape. In some cases, the convex shape may be triangular or pyramidal, for example. In the case of an out-runner machine, as shown in FIGS. 4-6, all of the surfaces of the magnets in contact with the back iron are convex and, yet, only the magnet of FIG. 6 is considered protruding. In some embodiments, an out-runner magnet may be considered protruding if any portion of the magnet surface in contact with the back iron is beyond the circular perimeter 900 established by the contact points 902 of the magnet sides to the back iron. An example of this is shown in FIG. 9.

The presently disclosed embodiments may offer a series of advantages. For example, the disclosed concepts may allow the magnet shape and back iron thickness to be selected to reduce weight and inertia while maintaining and possibly improving performance. The disclosed embodiments of protruding magnets may provide several advantages. For example, a reduced backer portion size may provide weight reduction to achieve particular machine performances or it may allow for providing machine performance enhancements with a particular weight limit. The protruding magnet design may reduce rotor weight and a rotor's moment of inertia. This can create efficiencies of operation due to reducing the resistance to rotation. Still further, the disclosed protruding magnet embodiments may allow for using a material for the backer portion with a relatively lower magnetic saturation point to achieve machine performances. This can reduce a machine's cost considerably. While backer portion weight and reduction has been discussed, these embodiments may also reduce the magnets' volume and weight considerably, which can also provide a considerable cost reduction for a permanent magnet machine. The protruding shape and corresponding valley shape on the backer portion may provide easy positioning of magnets on to the backer portion during assembly. Still further, the protruding shape may make the machine air gap flux density waveform and induced winding voltage waveform closer to being sinusoidal, which can be advantageous in particular applications. Considerations may be given to the magnet edge thickness to maintain mechanical strength and sufficient magnetic strength to withstand demagnetization. Additional consideration may be given to the back iron thickness near the middle of each magnet to maintain mechanical strength. However, use of protruding magnets may allow for the listed advantages over systems without protruding magnets.

The presently disclosed permanent magnet machines may be operated as a motor or a generator. In some cases, the machines described herein may be referred to as brushless DC (BLDC) machines if direct current (DC) power is involved in the application. The machines described herein may be used and advantageous for airplanes, missiles, unmanned air vehicles, and other airborne devices. Still other advantageous environments and applications may be apparent to those of skill in the art.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. An assembly for an electric machine comprising:
   a non-movable structure; and
   a moveable structure movable relative to the non-movable structure, the moveable structure including;
   a back iron having a contact side and a non-contact side and the contact side including a plurality of spaced recesses shaped to form a first recessed depth at a center of the recesses and a second smaller recessed depth on opposed sides of the recesses and a first back iron thickness between the first recessed depth and the non-contact side of the back iron at the center of the recesses and a second larger back iron thickness between the second recessed depth and the non-contact side of the back iron spaced from the center of the recesses; and
   a plurality of permanent magnets in the plurality of spaced recesses having a contact side abutting a recessed surface of the recessed and wherein the larger back iron thickness is spaced from a center of the magnet to provide a magnetic flux path between adjacent magnets.

2. The assembly of claim 1, wherein the contact side of the magnets abutting the recessed surface has a convex shape.

3. The assembly of claim 1, wherein the contact side of the magnet abutting the recessed surface includes a plurality of sloped surfaces to form a larger magnet thickness at the center of the magnets relative to a smaller magnet thickness proximate to sides of the magnets.

4. The assembly of claim 2, wherein the convex shape is formed by a curved surface.

5. The assembly of claim 3, wherein the sloped surfaces converge at the center of the magnets to form a generally V-shaped cross-sectional profile on the contact side of the plurality of magnets.

6. The assembly of claim 1 wherein the contact side of the magnets abutting the recessed surface has a profile shape in a form of a pair of line segments or series of line segments.

7. The assembly of claim 1 wherein the spaced recesses include a plurality of sloped surfaces to form the first and second recessed depths.

8. The assembly of claim 1 wherein the recessed surface of the recesses has a curved shaped profile.

9. The assembly of claim 1 wherein the movable structure is a rotor in concentric arrangement with and rotatable relative to the non-movable structure forming a stator and the stator includes one or a plurality of windings.

10. The assembly of claim 1 wherein the plurality of magnets have a first magnet thickness at the center of the magnets and a second smaller magnet thickness on opposed sides of the magnets spaced from the center of the magnets.

11. The assembly of claim 10 wherein the contact side of the magnets has a curved or sloped contact surface to form the first and second magnet thicknesses.

12. In an electric machine utilizing a back iron to provide a magnetic flux path for a plurality of adjacent permanent magnets, the improvement comprising a plurality of recesses along a contact side of the back iron spaced to align with the plurality of permanent magnets and the recesses are shaped to provide a first recessed depth at a center of the recesses and first back iron thickness between the recessed first recessed depth and a non-contact side of the back iron at the center of the recesses and a second smaller recessed depth spaced from the center of the recesses and a second larger back iron thickness between the second recessed depth and the non-contact side of the back iron spaced from the center of the recesses.

13. The electric machine of claim 12 wherein the back iron and the plurality of permanent magnets form a rotor rotatable relative to a stator having one or a plurality of windings.

14. The electric machine of claim 12 wherein the magnets include sloped surfaces on a contact side of the magnets abutting a recessed surface of the recesses to form a larger thickness dimension at a center of the magnets and a smaller thickness dimension on opposed sides of the magnets spaced from the center of the magnets.

15. The electric machine of claim 12 wherein a contact side of the magnets abutting a recessed surface of the recesses has a curved shape to form a larger thickness dimension at a center of the magnets and a smaller thickness dimensions on opposed sides of the magnets.

16. The assembly of claim 12 wherein the recesses include a plurality of sloped surfaces or curved surface shaped to form the first and second recessed depths.

17. An assembly for an electric machine comprising a movable structure movable relative to a non-movable structure, the movable structure comprising:
   a plurality of permanent magnets; and
   a back iron providing a magnetic flux path for the plurality of permanent magnets and the back iron having a contact side and a non-contact side and the contact side having a plurality of spaced recesses and the recesses are shaped to form a first recessed depth at a center of the recesses and a second smaller recessed depth spaced from the center of the recesses and a first thickness dimension between the magnets supported in the recesses and the non-contact side of the back iron at a center of the magnets and a second larger thickness dimension between the magnets and the non-contact side of the back iron spaced from the center of the magnets and the plurality of magnets have a first larger magnet thickness dimension at the center of the magnets and second smaller magnet thickness dimension spaced from the center of the magnets.

18. The assembly of claim 17 wherein the recesses include a plurality of sloped recessed surfaces or a curved recessed surface to form the first and second recessed depths of the recesses.

19. The assembly of claim 17 wherein a contact side of the magnets abutting a recessed surface of the recesses includes a plurality of sloped surfaces or a curved surface to form the first and second magnet thickness dimensions.

20. The assembly of claim 17 wherein the movable structure forms a rotor concentric with and rotatable relative to the non-movable structure forming a stator.

* * * * *

UNITED STATES PATENT AND TRADEMARK OFFICE
CERTIFICATE OF CORRECTION

| | | |
|---|---|---|
| PATENT NO. | : 11,418,079 B1 | Page 1 of 1 |
| APPLICATION NO. | : 16/986520 | |
| DATED | : August 16, 2022 | |
| INVENTOR(S) | : Qin et al. | |

It is certified that error appears in the above-identified patent and that said Letters Patent is hereby corrected as shown below:

On the Title Page

Item (63), Related U.S. Application Data should read:
(63) Continuation of Application No. 15/149,744 filed on May 9, 2016, now Pat. No. 10,742,086 and Provisional Application No. 62/158,572 filed on May 8, 2015.

Signed and Sealed this
Seventeenth Day of September, 2024

Katherine Kelly Vidal
*Director of the United States Patent and Trademark Office*